Patented Feb. 11, 1930

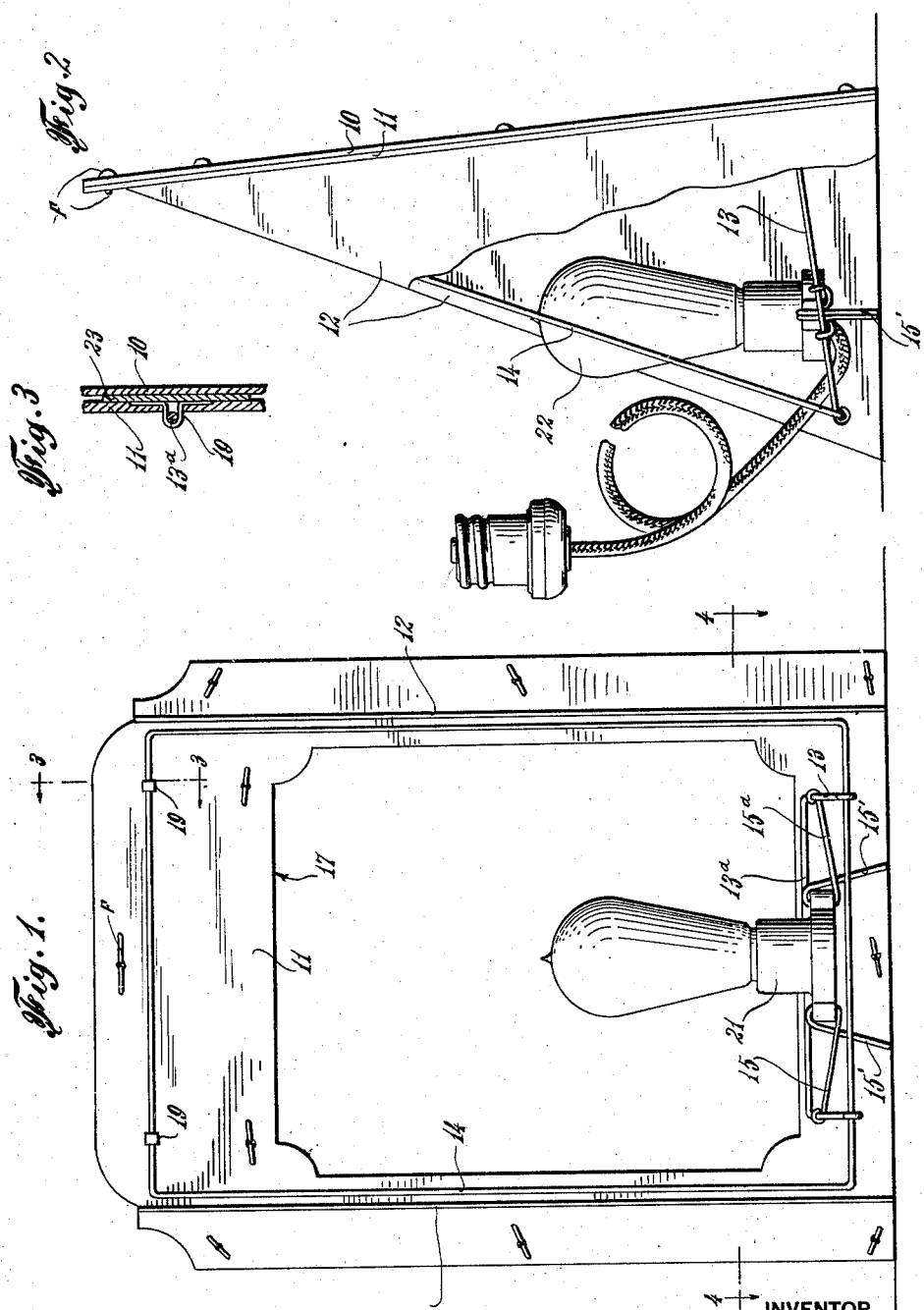

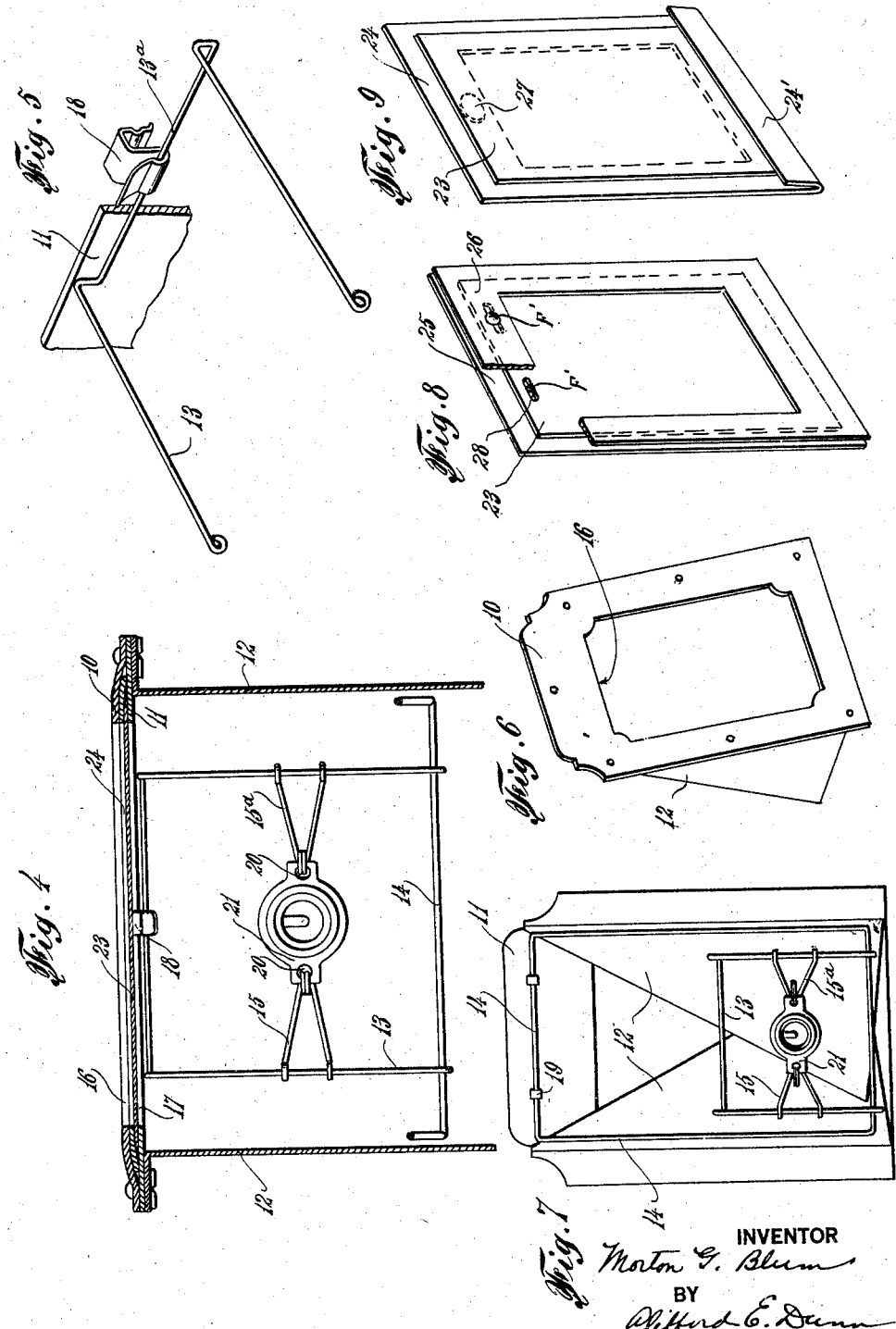

1,746,578

UNITED STATES PATENT OFFICE

MORTON G. BLUM, OF CEDARHURST, NEW YORK

TRANSLUCENCY-DISPLAY DEVICE

Application filed October 16, 1925, Serial No. 62,940. Renewed July 2, 1929.

This invention relates to devices for displaying translucencies; and more particularly seeks to provide a device of this kind which, although inexpensive to construct and in service, shall be attractive in appearance, efficient in operation, and very conveniently set up relative to the illuminating means employed.

Another object is to provide a device as above, but one which shall be especially useful in connection with a translucency comprising a more or less flexible sheet of fairly translucent material, as parchment, or a sheet even of a limp material, as onion-skin, tissue or other comparatively thin paper. The invention aims, further, to provide a new and improved display device for a translucency of the placard type, that is, carrying on its surface to be exposed to the observer a pictorial representation or other suitable message placed thereon by a printing-ink process; although of course the invention, in certain aspects, is not to be thus limited, as the translucency may be the common photographic transparency.

As to the comparatively non-rigid translucencies above mentioned, however, a further object of the invention is to provide not only a main translucency frame, for forming a permanent part of the device but a replaceable auxiliary frame carrying the translucency; with the two frames so designed and the auxiliary frame so carrying its translucency that a new translucency may be readily substituted for the previous one quickly and conveniently, and without danger of crumpling or otherwise damaging the rather delicate sheet constituting the translucency.

Also, as to such non-rigid translucencies, it is an object of the invention to provide a method of and means for supporting the translucency in such manner, on the auxiliary frame, or on the main frame aforesaid, or on any suitable support which is less moisture distensible than the non-rigid translucency mounted thereon, that the translucency will always persist in an uniplanar disposition despite any tendency thereof to expand or contract in response to changing atmospheric conditions.

Another object is to provide a translucency display device which is very light and hence readily portable, as from one show window, counter or the like, to another; from which it may be inferred, and correctly, that a special field of usefulness now contemplated for the device is that of commercial publicity, as the advertising of a commodity not necessarily manufactured by the retailer or other distributor handling the same. When the device is given this utilization, the importance of a translucency of a light weight and inexpensive character, such as non-rigid translucencies similar to those already described, will be readily appreciated; as well as the importance of an auxiliary frame as also already described, and especially an auxiliary frame itself of light weight and inexpensive construction.

Another object of the invention is to provide an auxiliary frame on which a translucency may be mounted by means facilitative of the method above referred to, and a combined auxiliary frame and translucency, of small cost and weight, whereby the exhibitor of the device may be periodically and inexpensively, by messenger or even by mail, furnished with substitute translucencies, each on its auxiliary frame.

A further object is to provide a translucency display device incorporating a main frame, an easel-support and a support for the illuminating means, as an ordinary electric light bulb, said support also preferably including means whereby the bulb may be set different distances in rear of the translucency; and wherein these elements may be collapsed to permit of the display device itself being delivered by mail.

Another object is to provide a collapsible device as just described, wherein the parts are so collapsed that costly packaging may be dispensed with and yet the device when wrapped for mailing will be acceptable to the postal authorities; and still another object is, further, to arrange the collapsible parts so that when collapsed no injury from them may come to the non-rigid translucency whenever such a translucency is set in the main frame in display position before the device is wrapped.

Various other aims of the invention, many of which particularly have to do with structural details permitting the objects enumerated hereinabove to be attained in a commercially practical manner, will be in part obvious and in part specifically pointed out hereinafter.

It is to be understood, however, that the specific details of construction now to be described, in connection with the embodiment of the invention shown in the accompanying drawings, which embodiment is of course merely illustrative of one possible mode of carrying out the invention, are not to be taken in a restrictive sense; as obviously the scope of protection contemplated is to be taken solely from the appended claims.

In the drawings,

Fig. 1 is a rear elevation of said embodiment, with the parts arranged to constitute as the device a display stand for exhibiting the translucency;

Fig. 2 is a side elevation, partially broken away;

Fig. 3 is an enlarged fragmentary section, taken on line 3—3 of Fig. 1, showing a detail of construction;

Fig. 4 is a horizontal section, taken on the line 4—4 of Fig. 1, with the bulb removed;

Fig. 5 is a perspective view showing certain of the parts in Fig. 4, and showing a fragment of one of such parts in section;

Fig. 6 is a three-quarter front perspective of the display stand as set up in Figs. 1 and 2;

Fig. 7 is a view similar to Fig. 1, but showing the parts collapsed and the bulb removed;

Fig. 8 is a perspective view, partially broken away and partially in section, showing one of two types of auxiliary frames as now preferred, and showing also a mode of mounting the translucency thereon in accordance with the invention; and Fig. 9 is an unmutilated perspective view, but otherwise similar to Fig. 8, showing the other preferred type of auxiliary frame.

The same characters of reference are applied to similar parts throughout the several views of the drawings.

The illustrative embodiment thus disclosed includes a main frame comprising two sheets 10 and 11, of cardboard or the like; a pair of side wings each comprising also a sheet 12 of similar material; and a skeleton framework comprising four lengths of bent wire respectively indicated at 13, 14, 15 and 15ª. The elements 15 and 15ª it will be noted are identical.

The sheet members 10 and 11 are provided with registering openings 16 and 17, when the front frame is established as a whole by securing the sheets 10 and 11 together, in any suitable manner, at points somewhat removed from the openings 16 and 17. A securing means, comprising a plurality of thin-metal piercing and clinching devices of a familiar type, as shown, one of which is marked F in Figs. 1 and 2, may be used. Then the translucency may be positioned in the device so as to have marginal portions overlapped by the parts of the sheets 10 and 11 adjacent their openings and so that otherwise the translucency will overlie the display window established by said opening.

The side-wing sheets 12, it will be noted, are secured to the front frame structure by some of the piercing and clinching devices which join together the sheets 10 and 11 of the front frame. These sheets 12 are scored so that their major portions may be swung as flaps to be disposed as shown in Fig. 7, when the device is collapsed, and so as to be arranged as shown in Figs. 1, 2, 4 and 6, then to constitute with the front frame an easel-support for the device.

Within the limits of such easel-support, the bent wire elements forming the framework aforesaid are adapted to be arranged to constitute a lamp-carrying structure.

Bent wire element 13 is shown clearly in Fig. 5, and is a swinging frame, adapted, when the skeleton frame-work is set up, to have its middle length 13ª seated in a resilient or impositive securing means constituted as shown in Fig. 5 by the upturned and middle leaves of a strip metal fixture 18. The downturned leaf thereof is crimped as clearly brought out in Fig. 5 whereby the fixture 18 may be friction fitted but securely mounted on the lower horizontal marginal portion of the opening 17 in sheet member 11 of the front frame structure.

Element 14 is a length of wire bent into a rectangular frame made into a closed loop in the present case by welding the free ends of the wire where they meet.

This element 14 permanently hingedly supports element 13, along the lower horizontal stretch of the element 14, by means of the terminal eyes on the element 13.

The upper horizontal stretch of the element 14 is journaled in the central loops of the two strip metal staples 19 shown in Figs. 1 and 3, it being noted from the latter view that only the rear sheet 11 of the front frame structure is pierced by the shanks of these staples. The terminal lengths of such shanks are nested between sheets 10 and 11 and pressed flat against sheet 11 so as not to interfere with the introduction and withdrawal of a translucency by way of the top opening of the front frame between the two sheets thereof.

The bent wire elements 15 and 15ª are identical, and made of a fairly flexible wire, in order that the lamp bracket afforded thereby shall be not only most inexpensive, but of minimum weight, and further, conveniently and quickly attachable to a standard electric socket, and adjustable to set the bulb to be carried by such socket different distances in rear of the front frame, when the skeleton frame-work is set up.

It will be seen from the drawings that the elements 15 and 15ª, hung by their own terminal loops on the loop carrying stretches of element 13, are slidable back and forth along said stretches when the skeleton frame-work is set up; and slidable in unison when the inner ends of the elements 15 and 15ª are hooked through the holes 20 on opposite sides of the standard type electric socket 21. The inner ends of the elements 15 and 15ª, such elements being made of fairly flexible wire, are easily bent as shown relative to the holes 20. Thus a standard socket may be readily incorporated in the device, after its delivery to the exhibitor, and at the same time, the lamp-carrier proper, that is, elements 15 and 15ª, may be rigidified by utilizing as described the inner ends of the elements 15 and 15ª and the ordinary wood-screw holes found in such sockets.

Referring now to Fig. 7, the device is shown in condition for ready local transport; although for mailing, the socket 21 will be omitted and the inner ends of elements 15 and 15ª will not be bent into hooks or loops as illustrated. With the parts arranged as shown in Fig. 7 it will be seen that the side-wings 12 and 13, first folded in, protect any translucency in position in the window of the front-frame from any possible damage or injury by any part of the skeleton frame-work when collapsed.

To establish the collapsed device of Fig. 7 as the display stand of Fig. 1, it is merely necessary first to swing up the skeleton frame-work, still in its flat collapsed condition, sufficiently to permit a swinging out of the side wings 12 and 13, then swing out the two wire frames of 13 and 14, and finally snap the stretch 13ª of the frame 13 into fixture 18 as shown in Fig. 5.

It will be noted that the frame-work and electric socket, and even the bulb in the latter, will be shielded from the view of an observer of the translucency, by the side wings which now constitute a part of the easel-support. See Fig. 6.

In Figs. 8 and 9 are shown two preferred methods of supplying a replacement translucency, the translucency in each case being indicated at 23. These views show auxiliary frames, made of one or more sheets of cardboard or the like; and to such an auxiliary frame the translucency is secured, so that the auxiliary frame and its translucency are to be inserted between the walls of the main frame and withdrawn, as one unit. The auxiliary frames of Figs. 8 and 9 differ in this, that while the latter includes but a single sheet 24, having an upturned bottom flap 24' for protecting the lower edge of the translucency when this auxiliary frame and its translucency are pushed down into the main frame by way of the top opening in the latter, the auxiliary frame of Fig. 8 includes two sheets 25 and 26 of cardboard or the like, for similarly protecting the lower edge of its translucency. Each of the sheets 24, 25 and 26, of course, has its own window opening to match the window opening in the main frame. In Fig. 4 the auxiliary frame of Fig. 9 is shown in place, with its translucency, in the main frame. As suggested above and as shown in Fig. 3 the translucency 23 may also be supported in the main frame without using the auxiliary frame, being then inserted directly between the sheets 10 and 11 of the main frame.

A protective structure for the lower edge of a non-rigid translucency, such as that afforded by the arrangement of Figs. 8 and 9, is desirable; and it is also an important feature of the present invention to mount a non-rigid translucency on an auxiliary frame in such a way that different portions of the translucency will not have any tendency to buckle or ripple relative to others, when any unsecured part of the translucency is impelled to expand, due to an increased moisture content for instance. According to the invention, also, the translucency is given merely a point support; preferably suspended from a point or points near its top. In the case of Fig. 9, such suspension is shown as resulting from applying a single "spot" 27 of a suitable adhesive. In the case of Fig. 8, a plurality of fasteners F', like the piercing and clinching devices F used in building up the main frame 10—11, are employed. Where a translucency is thus suspended as a result of being pierced by two devices F' at points somewhat separated it may be desirable to provide in the translucency openings 28 elongated in the direction of their spacings; so that while the shanks of the device F' may pass through these openings properly to suspend the translucency, there will be no restraint on an expansion or contraction of the translucency between said shanks.

It is obvious that the features of the invention last discussed may be incorporated, even when auxiliary frames other than those shown in Figs. 8 and 9 are employed. Also, said features of the invention may be incorporated when auxiliary frames are not used at all. In this case, of course, the translucency will be positioned directly between the sheets 10 and 11 of the front frame of the display device, but with the translucency suspended from a point or points, say at its top, in accordance with the foregoing principles.

Finally reverting to Figs. 1 and 2, it will be seen that the wire elements 15 and 15ª are made long enough, as to their inner ends to be bent down after being looped or hooked through the socket 21, that they act as positively functioning struts 15', for the purpose of insuring that the skeleton frame, and particularly the socket, is spaced a proper distance above the supporting floor, to comply with the fire laws.

I claim:

1. A translucency display device comprising a display stand including a lamp carrier adjustably and collapsibly connected in position, said display stand also including a front wall structure for carrying the translucency and having an opening across which the translucency may extend, and said lamp carrier being adjustable toward and away from said front wall structure.

2. A collapsible translucency display device having a front wall provided with an opening for displaying a translucency therein, and a collapsible structure connected to the rear of said wall comprising a plurality of skeleton frames collapsible into substantial parallelism with the front wall, one of the frames carrying a lamp-carrier adjustable toward and away from the translucency when the collapsible structure is expanded.

3. A collapsible translucency display stand adapted when collapsed to be acceptable for mail transport, and to be safely thus transported, comprising a structure including a plurality of foldable flaps of sheet material, a front member having an opening across which a translucency may extend, said flaps being so arranged that when the device is extended the said front member and the flaps co-act to form an easel-support for the stand, and a collapsible lamp-carrier structure attached to the flap-carrying structure and including a plurality of relatively adjustable members, certain of said flaps being interposed between said opening and said lamp carrier structure when the stand is in collapsed condition.

4. A collapsible translucency display stand adapted when collapsed to be acceptable for mail transport, and to be safely thus transported, comprising a structure including a plurality of foldable flaps of sheet material, a front member having an opening across which a translucency may extend, said flaps being so arranged that when the device is extended the said front member and the flaps co-act to form an easel-support for the stand, and a collapsible lamp-carrier structure attached to the flap-carrying structure and including a plurality of relatively adjustable members, said members made of lengths of bent wire, the parts being so arranged that the flaps may be collapsed first and the bent wire members last, the flaps being so shaped as to prevent said members from damaging the translucency.

5. A translucency display stand including, in combination, a front frame having a display opening and adapted to support a translucency to overlie the opening, a lamp supporting collapsible and extensible frame carried by the display stand and collapsible against the back of said front frame, and a supporting member movably attached to said front frame to provide an easel support therefor and movable to interposed position between said display opening and said collapsible frame when the latter is in collapsed position.

6. A translucency display stand including, in combination, a front frame having a display opening and adapted to support a translucency to overlie the opening, wing frames hinged at opposite sides on said front frame for substantially parallel disposition in the rear of the front frame thereby to form an easel support and a lamp carrier connected to said front frame between lines of hinging of said wing frames whereby the latter, when extended, provides shields to shield the lamp carrier and its lamp from the view of an observer of the translucency.

7. A translucency display stand including, in combination, a front frame having a display opening and adapted to support a translucency to overlie the opening, a lamp supporting collapsible and extensible frame carried by the display stand and collapsible upon the back of said front frame, and a lamp supporting bracket carried by said lamp supporting frame and connected thereto for adjustment toward and away from said front frame when said lamp supporting frame is extended.

8. A translucency display stand including, in combination, a front frame having a display opening and adapted to support a translucency to overlie the opening, a lamp supporting collapsible and extensible frame carried by the display stand and collapsible upon the back of said front frame, a lamp supporting bracket carried by said lamp supporting frame and connected thereto for adjustment toward and away from said front frame when said lamp supporting frame is extended, and a supporting member movably attached to said front frame to provide an easel support therefor and being movable to interposed position between said display opening and said collapsible frame when in collapsed position.

9. A translucency display device having a front wall provided with an opening for displaying a translucency therein, a plurality of skeleton frames each formed of a single length of bent wire, both frames engaging the front wall and interlocking with the wall to establish a comparatively rigid skeleton frame-work in rear of the translucency for carrying a lamp, and a bent wire lamp carrying bracket slidably carried by one of said skeleton frames.

10. A translucency display device having a front wall provided with an opening for displaying a translucency therein, a plurality of skeleton frames each formed of a single length of bent wire, both frames engaging the front wall and interlocking with the wall to establish a comparatively rigid skeleton frame-work in rear of the translucency for carrying a lamp, and a bent wire structure for detachably holding a light bulb socket carried by said skeleton frame-work.

11. A translucency display stand including, in combination, a front frame having a display opening and adapted to support a translucency to overlie the opening, a lamp supporting collapsible and expansible frame carried by the stand and being collapsible upon the back of said front frame, a supporting member movably attached to said front frame to provide an easel support for the stand and a lamp supporting bracket carried by said collapsible frame, said movable supporting member when moved into supporting position forming a concealing screen for said lamp bracket and a lamp carried thereby.

12. In a display device, in combination, a frame provided with an opening, a non-rigid translucency held by the frame to overlie said opening, a plurality of spaced attachments between one margin of said translucency and frame and the opposite margin of the translucency being free from attachment to said frame, one of said attachments including an elongated slot and a supporting pin extending therethrough so as to permit relative movement of the translucency across the supporting pin, and a retaining guard for the unattached translucency margin.

MORTON G. BLUM.